US008242741B2

(12) United States Patent
Phelps, III

(10) Patent No.: US 8,242,741 B2
(45) Date of Patent: Aug. 14, 2012

(54) SYSTEMS, APPARATUS AND DEVICES FOR WIRELESS CHARGING OF ELECTRONIC DEVICES

(75) Inventor: William C Phelps, III, Lawrenceville, GA (US)

(73) Assignee: Motorola Mobility LLC, Libertyville, IL (US)

( * ) Notice: Subject to any disclaimer, the term of this patent is extended or adjusted under 35 U.S.C. 154(b) by 430 days.

(21) Appl. No.: 12/337,846

(22) Filed: Dec. 18, 2008

(65) Prior Publication Data

US 2010/0156345 A1 Jun. 24, 2010

(51) Int. Cl.
*H02J 7/00* (2006.01)
(52) U.S. Cl. ............... 320/108; 320/107; 320/115
(58) Field of Classification Search ................ 320/108
See application file for complete search history.

(56) References Cited

U.S. PATENT DOCUMENTS

| | | | | |
|---|---|---|---|---|
| 4,005,396 A | * | 1/1977 | Fujiwara et al. | 340/870.32 |
| 5,136,558 A | * | 8/1992 | Getreuer et al. | 369/44.15 |
| 5,821,731 A | * | 10/1998 | Kuki et al. | 320/108 |
| 7,352,567 B2 | | 4/2008 | Hetelling et al. | |
| 7,381,643 B2 | | 6/2008 | Sakai et al. | |
| 2002/0008601 A1 | * | 1/2002 | Yajima et al. | 335/220 |
| 2006/0043927 A1 | | 3/2006 | Beart et al. | |
| 2006/0076922 A1 | * | 4/2006 | Cheng et al. | 320/108 |

FOREIGN PATENT DOCUMENTS

WO 2004030176 A2 4/2004

* cited by examiner

*Primary Examiner* — Arun Williams
(74) *Attorney, Agent, or Firm* — Gary J. Cunningham

(57) ABSTRACT

Disclosed are systems, apparatus and devices for wireless charging of electronic devices that include magnets in close proximity to primary and secondary inductive charging coils to move the coils within close proximity and within axial alignment to one another. The system includes a charging apparatus including a first coil having within close proximity a first magnet, the primary coil and magnet together capable of moving within the charging apparatus in accordance with magnetic attraction. A battery charging device includes a secondary coil having within close proximity a second magnet. The magnets can attract so that the coils are moved close together. In this way the respective coils are coupled so that inductive charging may be provided. An engagement structure of the charging apparatus can help to maintain the first coil in a particular orientation within the charging apparatus so that the alignment of the coils is optimized.

19 Claims, 5 Drawing Sheets

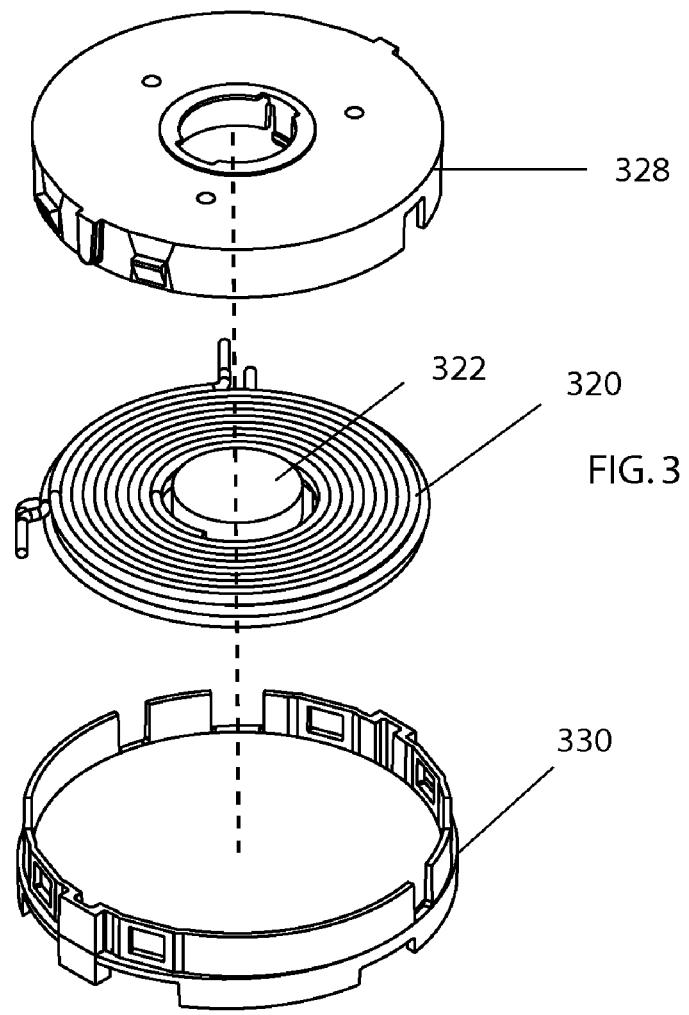
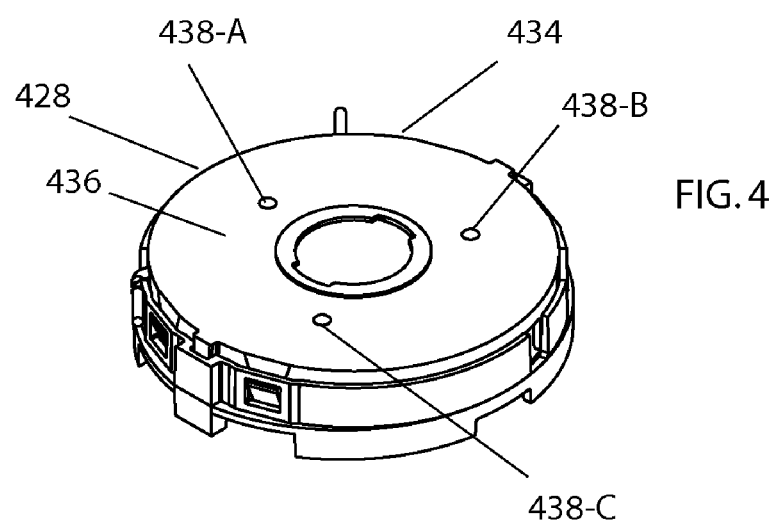

SYSTEMS, APPARATUS AND DEVICES FOR WIRELESS CHARGING OF ELECTRONIC DEVICES

FIELD

Disclosed are systems, apparatus and devices for wireless charging of electronic devices that include magnets in close proximity to primary and secondary inductive charging coils to move the coils within close proximity and within axial alignment to one another.

BACKGROUND

Wireless chargers provide inductive charging to batteries of electronic devices. Inductive charging pads can include multiple transformers so that the electronic device can be placed in any orientation on the pad. When the electronic device including a battery is placed on the pad, one of the transformers of the pad induces current in the transformer of the electronic device charging device, and this current charges the battery. Unfortunately, the efficiency of the transform is not very good since the transformer located on the within the battery charging device of the electronic device typically does not align with the transformers of the pad and therefore does not create closed magnetic loop and so there is no direct inductive coupling. In some inductive charging systems, a docking station is provided on the charging apparatus for the electronic device so that the transformers of the device and the charger are aligned.

BRIEF DESCRIPTION OF THE DRAWINGS

FIG. 3 depicts an embodiment of a round primary coil and a first magnet in alignment with the top portion of a housing and the bottom portion of a coil housing;

FIG. 4 depicts an embodiment of a housing that can cooperate with an engagement structure of the charging apparatus;

DETAILED DESCRIPTION

Figure 1:
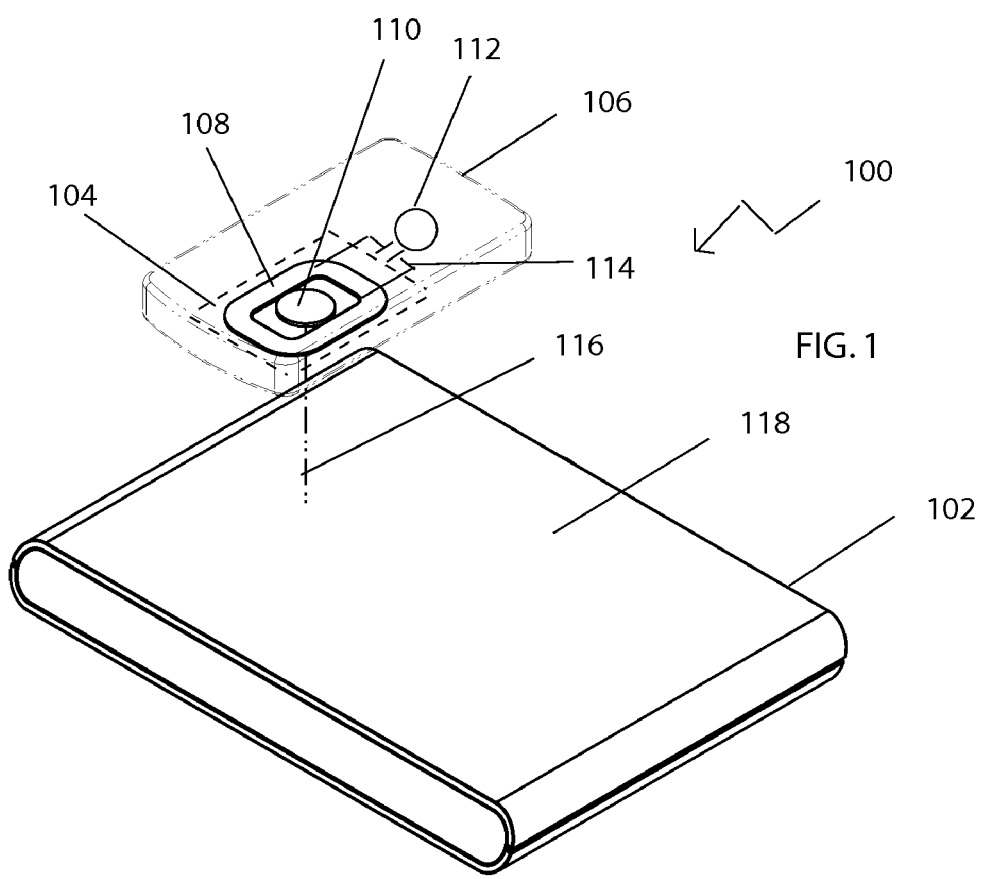
FIG. 1 depicts an embodiment of the system including a charging apparatus and a battery charging device within dotted lines depicted within an electronic device, the battery charging device configured for coupling a battery to the secondary coil.

It would be beneficial to provide spatial freedom for positioning a battery charging device of an electronic device on the pad of a charging apparatus. In particular, spatial freedom refers to the ability to place the device at any orientation on the pad for charging within a generally defined location. Moreover, it would be beneficial with the spatial freedom if the primary coil (the coil in the charge platform) and the secondary coil (the coil of the electronic device) where optimally coupled. It would be optimum if the two coils axially aligned, since as the coil offset increases, the efficiency of the charge goes down. To compensate for non-alignment, the power is detrimentally increased, resulting in an undesirable temperature rise of either or both the charging apparatus and the electronic device. Moreover, the ability to place the device at any orientation on the pad for charging within a generally defined location provides a user with fewer requirements to initiate the device battery charging process.

Disclosed is a system for charging the battery of an electronic device, a charging apparatus for charging a battery, and a battery charging device. The system includes a charging apparatus including a first coil having within close proximity a first magnet, the primary coil and magnet together capable of moving within the charging apparatus in accordance with magnetic attraction and a battery charging device including a second coil having within close proximity a second magnet, the battery charging device configured for coupling a battery to the secondary coil. The terms primary and secondary may be interchangeable as may be the terms first coil and second coil. The first magnet and second magnet have attracting polarity so that when the battery charging device is placed on a pad of the charging apparatus, the magnets attract, so that the first magnet associated with the primary coil and the second magnet associated with the secondary coil are moved close together. In this way the respective coils are coupled so that inductive charging may be provided. Spatial freedom is provided by allowing the primary coil to go to the battery charging device when the battery charging device is placed close to the primary coil so the first magnet and the second magnet are within the magnetic pull of one another. Moreover, an engagement structure of the charging apparatus can help to maintain the first coil in a particular orientation within the charging apparatus so that the alignment of the coils is optimized.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

FIG. 1 depicts an embodiment of the system 100 including a charging apparatus 102 including a primary coil and first magnet (see FIG. 2) and a battery charging device 104 within dotted lines depicted within an electronic device 106 including a secondary coil 108 having within close proximity a second magnet 110. The battery charging device 104 is configured for coupling a battery 112 to the secondary coil 108. The battery 112 may be coupled to the battery charging device 104 by a circuit 114.

The battery charging device 104 within dotted lines depicted within an electronic device 106 is further depicted on a trajectory 116 to the charging apparatus 102. Based on the configuration of the depicted embodiment of the charging apparatus 102, the battery charging device 104 can rest on a top surface 118 of the charging apparatus 102. It is understood that the charging apparatus 102 may have any suitable configuration. The battery charging device 104 of course can be utilized in any type of battery powered electronic device, including for example a mobile communication device. It is understood that the battery charging device 104, including the secondary coil 108 and magnet 110 within close proximity to the secondary coil 108 may be utilized to charge any type of battery 112 for any type of electronic device 106.

Figure 2:
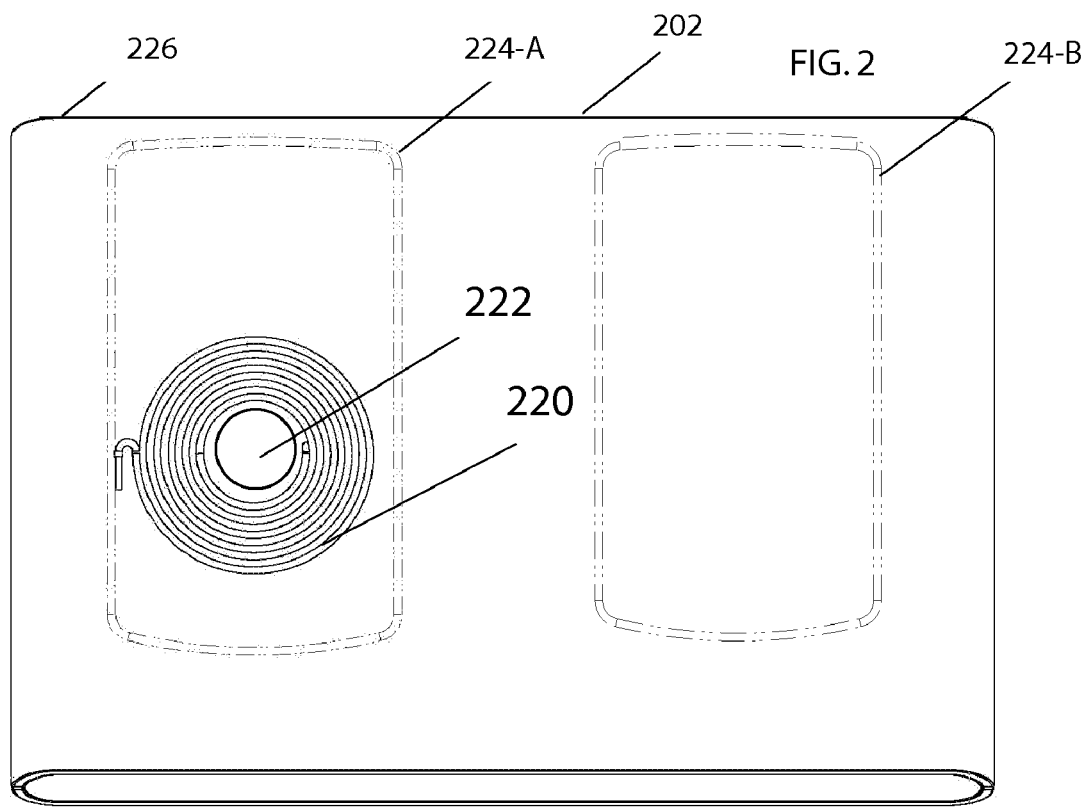
FIG. 2 depicts another view of the charging apparatus depicted in FIG. 1, including a view of the inside of the charging apparatus showing the primary coil and the first magnet positioned within a generally defined location of the charging apparatus housing.

FIG. 2 depicts another view of the charging apparatus 202 depicted in FIG. 1, in including a view of the inside of the charging apparatus 202 showing the primary coil 220 and the first magnet 222 within the a generally defined location 224-A of the charging apparatus 202 housing 226. For illustrative purposes, another generally defined location 224-B may be proximal another primary coil and magnet. It is understood that the housing 226 can having any suitable shape and/or dimensions and may include any suitable number generally defined locations. The two coils, that is, the primary coil 220 has a round shape and the secondary coil 108 (see FIG. 1) has a rectangular shape. It is understood that shape of the coils can be any suitable shape. The two magnets, the first magnet 222 and the second magnet 110 are within close proximity to their respective coils. In one embodiment, the first magnet 222 is within the center region of the rectangular primary coil 220. Also the second magnet 110 is within the center region of the rectangular secondary coil 108. It is understood that a magnet may be in any suitable position with respect to a coil to cause the coils to move close together for inductive charging.

FIG. 3 depicts an embodiment of a round primary coil 320 and a first magnet 322 in an expanded view with the top portion 328 of a coil housing and the bottom portion 330 of the coil housing. The housing (see FIG. 3) for the coil cooperates with an engagement structure of the charging apparatus, discussed below, that can help to maintain the first coil 320 in a particular orientation within the charging apparatus 202 (see FIG. 2) so that the alignment of the coils is optimized.

FIG. 4 depicts an embodiment of a housing 434 that can cooperate with an engagement structure, discussed below, of the charging apparatus 202 (see FIG. 2). The top surface 436 of the top portion 428 of the housing 434 may include protrusions 438-A, 438-B and 438-C thereon. It is understood that there may be any suitable number of protrusions 438-A, 438-B and 438-C, they may be in any suitable position on the top portion 428 of the housing 434 and may be of any suitable configuration. The protrusions 438-A, 438-B and 438-C, as will be illustrated below, reduce the surface area of the top surface 436 of the top portion 428 of the coil 434 when it touches the housing cavity of the charging apparatus 202, discussed below, to allow the first coil 320 (see FIG. 3) to move therein.

Figure 5:
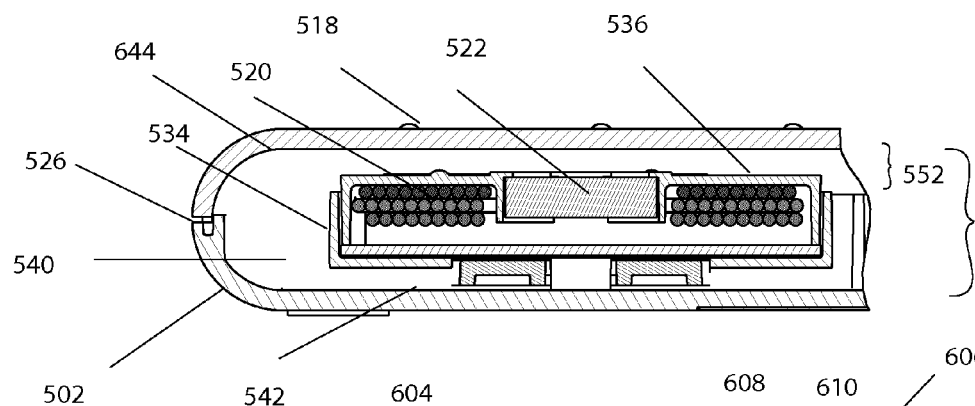
FIG. 5 is a cut-away view an embodiment of the housing cavity of the charging apparatus illustrating the coil housing, the primary coil, and the first magnet therein and resting on the inside bottom surface of the housing cavity.

FIG. 5 is a cut-away view an embodiment of the housing cavity 540 of the charging apparatus 502 illustrating the coil housing 534, the primary coil 520, and the first magnet 522 therein and resting on the bottom surface 542 of the housing cavity 540. Since the first magnet 522 is not within magnetic attraction range of a second magnet (not shown), the coil housing 534 rests on the bottom surface 542 of the housing cavity 540. The bottom surface 542 of the housing cavity 540 may include a ferrous metal or low power magnet to keep the coil housing 534 at rest on the bottom surface 542 until another magnet is introduced to attract the first magnet 522. Additionally, a magnet or ferrous material of a low magnetic force may be positioned on the bottom surface of the coil housing 534 to drive the coil housing 534 to the bottom surface 542 of the housing cavity 540 when the first magnet 522 is not within the magnetic attraction of a second magnet of a battery charging device (see FIGS. 6 and 7).

While the coil housing 534 is depicted resting on the bottom surface 542, it understood that when the first magnet 522 is within the magnetic attraction range of a second magnet (not shown) it can freely move vertically within the housing cavity 540. In one embodiment, the coil housing 534 is free to move in three dimensions within the housing cavity 540. The first dimension in which it can move is vertically. The charging apparatus housing cavity 540 includes a distance 550 from the inside bottom surface 542 to the inside top surface 544. There is also a distance 552 from the top surface of the primary coil housing 534 to the inside top surface 544 of the housing cavity 540. When the coil housing 534 and its associated first magnet 522 are within the magnetic attraction range of a second magnet (not shown) it can freely move vertically within the housing cavity 540 the distance identified as distance 552.

Figure 6:
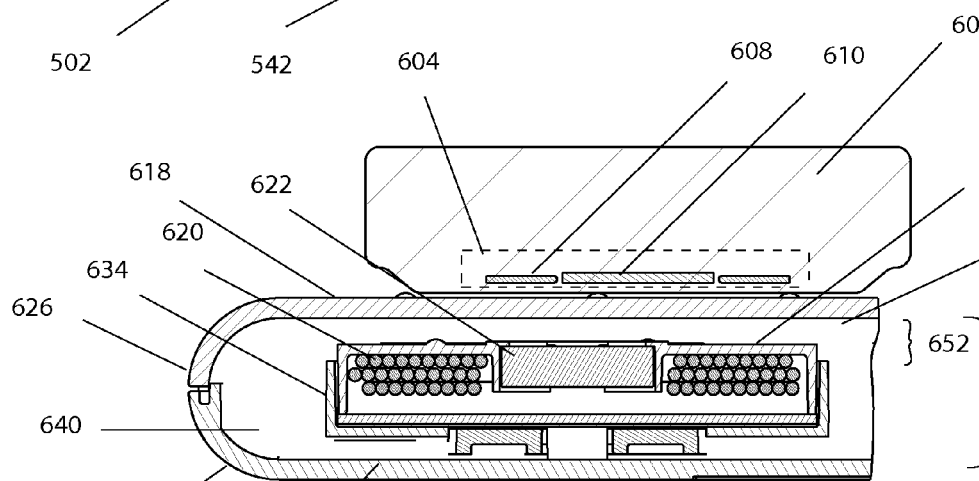
FIG. 6 is a cut-away view an embodiment of the housing cavity of the charging apparatus illustrating the coil housing, the primary coil, and the first magnet therein and resting on the bottom surface of the housing cavity and a secondary coil and second magnet within close proximity.

FIG. 6 is a cut-away view an embodiment of the housing cavity 640 of the charging apparatus 602 illustrating the coil housing 634, the primary coil 620, and the first magnet 622 therein and resting on the inside bottom surface 642 of the housing cavity 640. An electronic device 606 including a battery charging device 604 including a secondary coil 608 and a second magnet 610 is positioned on the outside top surface 618 of the charging apparatus 602 housing 626. There distance 652 from the top surface 636 of the primary coil housing 634 to the inside top surface 644 of the housing cavity 640 may allow sufficient distance between the first magnet 622 and the second magnet 610 so that under a magnetic attraction, the magnets may find one another. Depending upon the strengths and sizes of the magnets, a suitable distance 652 can provide a predetermined gap in the static position. For example, approximately a seven millimeter distance 652 between the magnets when the primary coil housing 634 is resting on the inside bottom surface 642 of the housing cavity 640 may enable them to attract one another.

Figure 7:
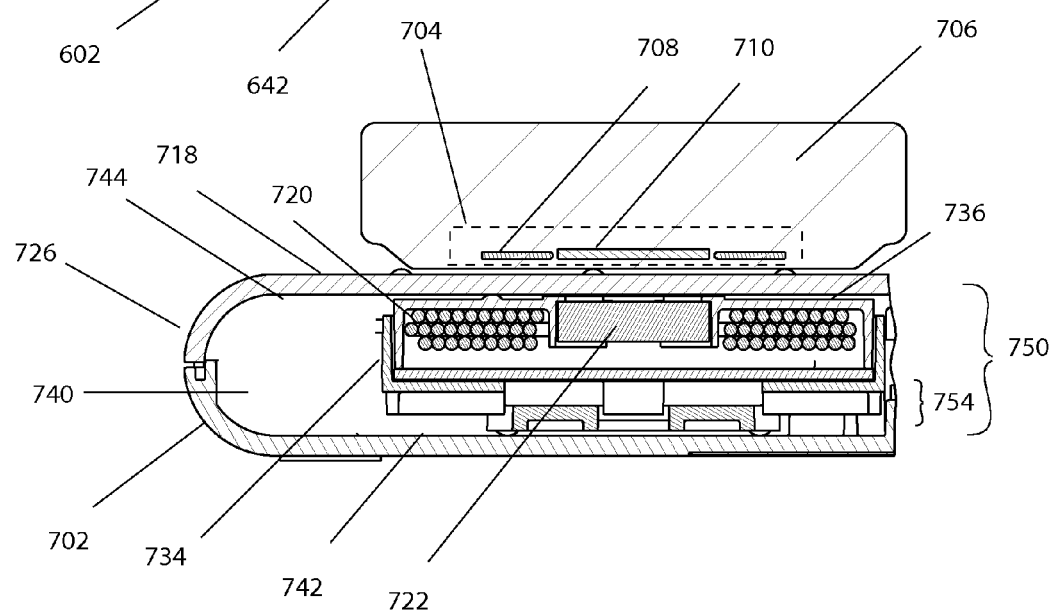
FIG. 7 is a cut-away view an embodiment of the housing cavity of the charging apparatus illustrating the coil housing, the primary coil, and the first magnet therein and having been moved to the inside top surface of the housing cavity.

FIG. 7 is a cut-away view an embodiment of the housing cavity 740 of the charging apparatus 702 illustrating the coil housing 734, the primary coil 720, and the first magnet 722 therein and having been moved to the inside top surface 744 of the housing cavity 740. The electronic device 706 including a battery charging device 704 including a secondary coil 708 and a second magnet 710 is positioned on the outside top surface 718 of the charging apparatus 702 housing 726 as also shown in FIG. 6. The magnetic attraction of the first magnet 722 and the second magnet 710 can cause the coil housing 734, the primary coil 720, and the first magnet 722 therein to move vertically from a resting position on the inside bottom surface 742 of the housing cavity 740 so that the top surface 736 of the coil housing 734 to touch the inside top surface 744 of the housing cavity 740. That is, the coil housing 734 can move a distance 754 vertically.

Figure 8:
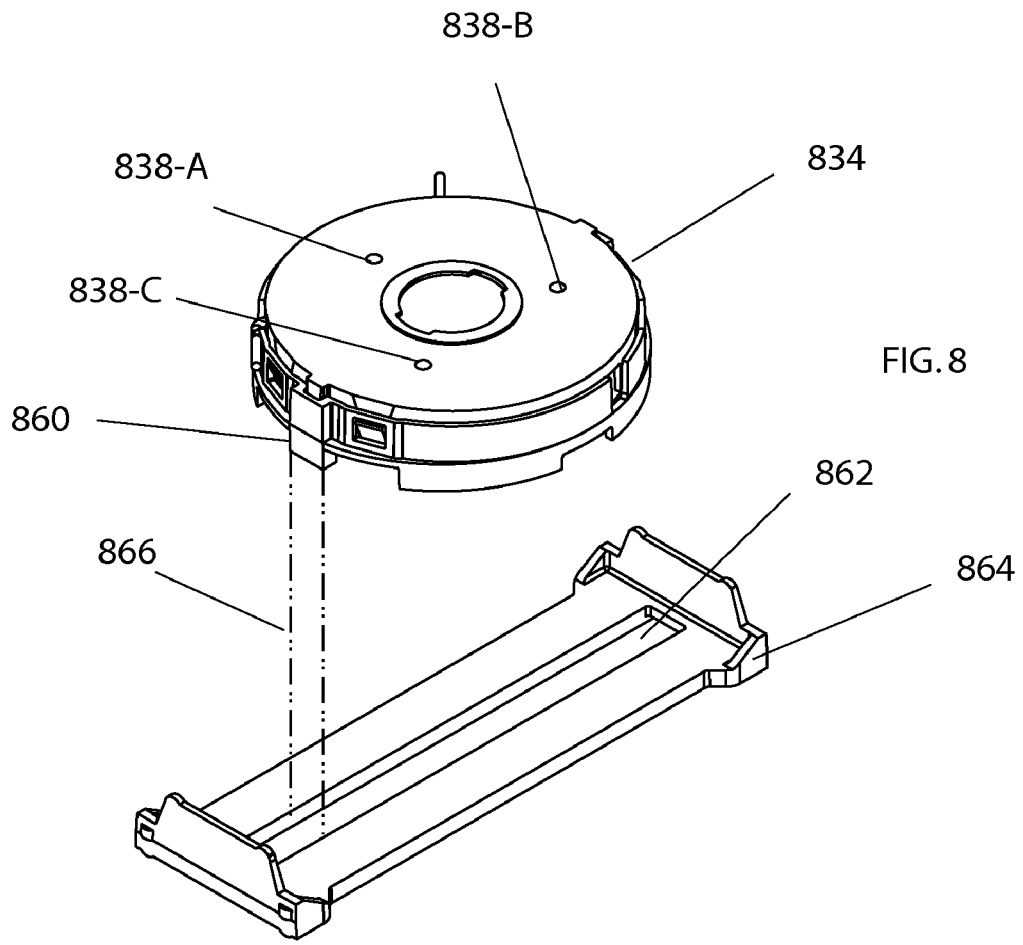
FIG. 8 is an embodiment of the coil housing including a guide which can be inserted into a slot of a rail.

FIG. 8 is an embodiment of the coil housing 834 including a guide 860 which can be inserted into a slot 862 of a rail 864. As mentioned above, the primary coil 220 (see FIG. 2) and the secondary coil 108 (see FIG. 1) can be any suitable configuration. In the example of FIG. 3, the primary coil 320 (see FIG. 3) is circular. The coil housing 834 depicted in FIG. 8 can house a circular coil (not shown). In one embodiment, a rectangular coil shape may maximize the coupling area when the coils are not aligned. One coil may be wider than the other so there may be an overlap to compensate for the non-alignment. A circular primary coil utilized in conjunction with a circular secondary coil may provide more degrees of spatial freedom since when a user places the electronic device 106 onto the top surface 118 of the charging assembly 102, the battery charging device 104 may have any orientation with respect to the primary coil 320. The secondary coil 608 (FIG. 6), may be, for example, circular.

Coil alignment may be further enhanced by placing both the primary coil magnet and the secondary coil magnet in the center regions of the coils and by using round coils. For example, if magnets are the same diameter, they can be naturally centered to each other. In one embodiment, the primary coil of the coil housing 834 can be fixed in rotation but be allowed limited movement in three directions, such as vertically as illustrated above, and in two horizontal directions. In this way, rotation of the primary coil of the coil housing 834 may be avoided.

FIG. 8 shows a similar arrangement as that of FIG. 7. As depicted in FIG. 7, the electronic device 706 (see FIG. 7) including a battery charging device 704 including a secondary coil 708 and a second magnet 710 is positioned on the outside top surface 718 of the charging apparatus 702 housing 726. When the coil housing 734 moves up, the top surface 736 of the coil housing 734 can touch the inside top surface 744 of the housing cavity 740. To move the coil housing in either horizontal direction within the housing cavity 740 as the primary magnet 722 and secondary magnet 710 attract, frictional force from the two surfaces, one moving against the other can be reduced by protrusions 838-A, 838-B and 838-C reducing the areas of the surfaces that touch. To move the coil 320 (see FIG. 3) with spatial freedom in one horizontal direction but while fixing the rotation of the coil 320, the coil housing 834 may include a guide 860 which can be inserted into a slot 862 of rail 864 as depicted by the trajectory lines 866.

Figure 9:
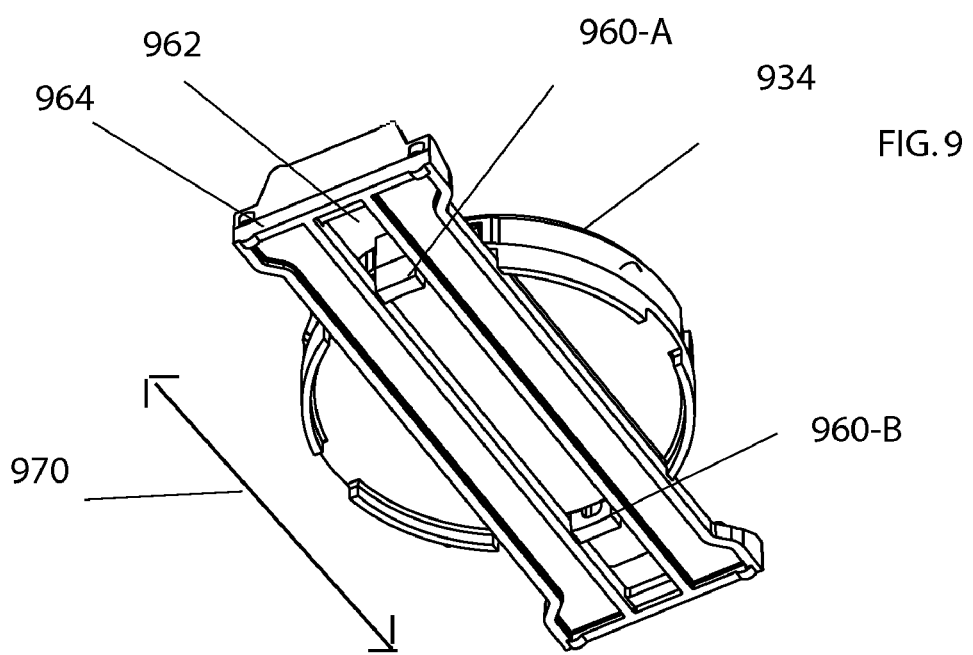
FIG. 9 depicts an embodiment of the coil housing including two guides inserted into a slot of a rail.

FIG. 9 depicts an embodiment of the coil housing 934 including two guides 960-A and 960-B inserted into the slot 962 of rail 964. Arrow 970 indicates that the coil housing 934 can move linearly along the rail 964. It is understood that any suitable configurations for the coil housing 934 and rail 964 are within the scope of this discussion.

Figure 10:
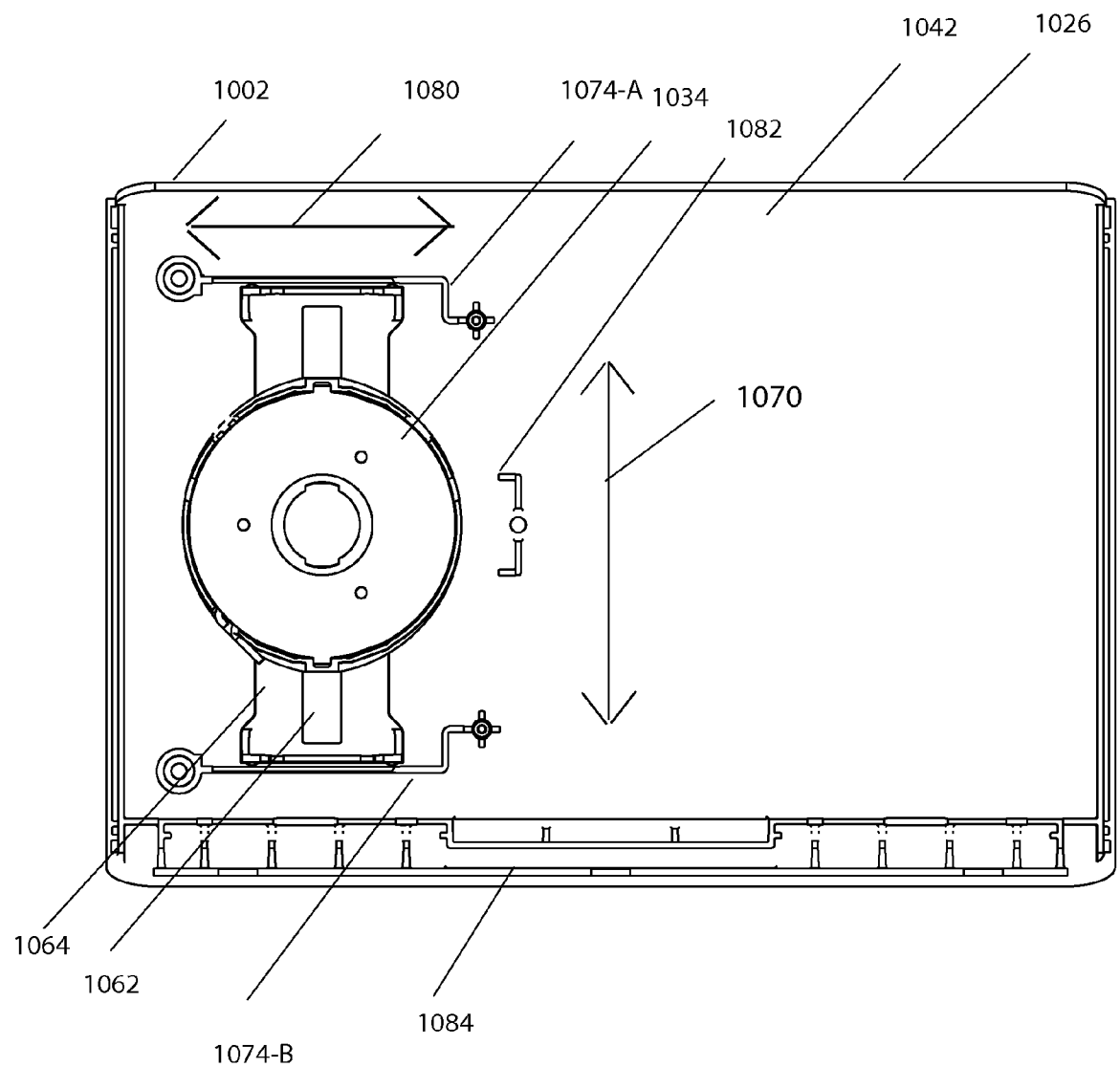
FIG. 10 depicts an embodiment of the bottom surface of the housing of a charging assembly with a coil housing within an engagement structure to maintain the primary coil in a particular orientation within the charging apparatus.

FIG. 10 depicts an embodiment of the bottom surface 1042 of the housing 1026 of a charging assembly 1002 with a coil housing 1034 within an engagement structure to maintain the primary coil in a particular orientation within the charging apparatus 202 (see FIG. 2). As discussed above, alignment of the coils optimizes the inductive charging of the system. The coil housing 1034 is inserted into slot 1062 of rail 1064 so that it may have freedom to move in the horizontal direction of arrow 1070. Also depicted is an embodiment of a set of rails 1074-A and 1074-B which can couple to a rail such as rail 1064 in any suitable manner to provide freedom to move in the horizontal direction of arrow 1080. An additional guide 1082 may provide the coil housing 1034 a resting place in the horizontal direction depicted by arrow 1080. The circuitry shown 1084 may be used to provide current to one or more primary coils of the charging apparatus.

The disclosed system for charging the battery of an electronic device, a charging apparatus for charging a battery, and a battery charging device can utilize a magnetic force sufficient to physically move a primary coil to align with a secondary coil thereby maximizing energy transfer efficiency. Spatial freedom is provided by allowing the primary coil to go to the battery charging device when the battery charging device is placed close to the primary coil so the primary coil and the secondary coil are within the magnetic pull of one another. Moreover, an engagement structure of the charging apparatus can help to maintain the first coil in a particular orientation within the charging apparatus so that the alignment of the coils is optimized. Accordingly, non-alignment is minimized so that an undesirable temperature rise of either or both the charging apparatus and the electronic device can be avoided. Moreover, the ability to place the device at any orientation on the pad for charging within a generally defined location provides a user with fewer requirements to initiate the device battery charging process.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A system for charging a battery of an electronic device, comprising:
    a charging apparatus including a first coil having within close proximity a first magnet, the first coil and the first magnet together capable of moving within the charging apparatus in response to mutual magnetic attraction between the first magnet and a second magnet corresponding to a battery charging device; and
    the battery charging device including a second coil having within close proximity the second magnet, the battery charging device configured for coupling a battery to the second coil.

2. The system of claim 1, wherein the charging apparatus further comprises:
    a plurality of coils capable of moving within the charging apparatus, each of the coils having within close proximity a magnet.

3. The system of claim 1, wherein the first coil includes a center region and the first magnet is disposed within the center region.

4. The system of claim 1, wherein the second coil includes a center region and the second magnet is disposed within the center region.

5. The system of claim 1, wherein the charging apparatus further comprises:
    a housing cavity configured to allow the first coil to move therein.

6. The system of claim 1 wherein the first coil is supported by a housing including protrusions thereon.

7. The system of claim 1 wherein the first coil is circular.

8. The system of claim 1 wherein the first coil is rectangular.

9. The system of claim 1 wherein the charging apparatus further comprises an engagement structure to maintain the first coil in a particular orientation within the charging apparatus.

10. The system of claim 1 wherein the first magnet and second magnet have attracting polarity.

11. The system of claim 1 wherein the electronic device is a mobile communication device.

12. The system of claim 1, wherein the battery charging device includes a circuitry with which to couple a battery to the first coil.

13. The device of claim 12, wherein the first coil includes a center region and the first magnet is disposed within the center region.

14. The device of claim 12 further comprising:
a support assembly configured to arrange the device for use with the electronic device.

15. A charging apparatus, comprising
a coil having within close proximity a first magnet, the coil and the first magnet together capable of moving within the charging apparatus in response to mutual magnetic attraction between the first magnet and a second magnet corresponding to a battery charging device.

16. The apparatus of claim 15, wherein the charging apparatus further comprises:
a plurality of coils capable of moving within the charging apparatus, each of the coils having within close proximity a magnet.

17. The apparatus of claim 15, wherein the coil includes a center region and the magnet is disposed within the center region.

18. The apparatus of claim 15 wherein the coil is supported by a housing including protrusions thereon.

19. The apparatus of claim 15, wherein the charging apparatus further comprises an engagement structure to maintain the coil in a particular orientation within the charging apparatus.

* * * * *